US012746996B2

(12) United States Patent
Sakamoto et al.

(10) Patent No.: US 12,746,996 B2
(45) Date of Patent: Sep. 29, 2026

(54) VEHICLE

(71) Applicant: Honda Motor Co., Ltd., Tokyo (JP)

(72) Inventors: Tomokazu Sakamoto, Saitama (JP); Kazumasa Ozaki, Saitama (JP); Masaki Goto, Saitama (JP)

(73) Assignee: Honda Motor Co., Ltd., Tokyo (JP)

( * ) Notice: Subject to any disclaimer, the term of this patent is extended or adjusted under 35 U.S.C. 154(b) by 662 days.

(21) Appl. No.: 18/171,673

(22) Filed: Feb. 21, 2023

(65) Prior Publication Data

US 2023/0294787 A1 Sep. 21, 2023

(30) Foreign Application Priority Data

Mar. 17, 2022 (JP) ................................. 2022-042988

(51) Int. Cl.
*B62K 11/00* (2006.01)

(52) U.S. Cl.
CPC .................................. *B62K 11/007* (2016.11)

(58) Field of Classification Search
CPC .............. B62K 11/007; B62K 2204/00; A61G 2203/14; A61G 2203/40; A61G 2203/42; A61G 5/043; A61G 5/101; A61G 5/1029; A61G 5/1059; A61G 5/128; B62H 1/06; B62H 2700/00; B62J 27/10
See application file for complete search history.

(56) References Cited

U.S. PATENT DOCUMENTS 9,056,629 B2 * 6/2015 Kamo .................... G05B 15/00
9,682,603 B2 * 6/2017 Richter ................ A61G 5/1056
10,052,246 B2 * 8/2018 Lozano ................ G05D 1/0061
10,912,688 B2 * 2/2021 Cooper .................. A61G 5/061
11,294,415 B2 * 4/2022 Schmidt ............... A61G 5/1051
11,351,860 B2 * 6/2022 Raja ..................... B60K 7/0007
(Continued)

FOREIGN PATENT DOCUMENTS

EP 2664525 11/2015
JP 2009040165 2/2009
(Continued)

OTHER PUBLICATIONS

"Notice of Reasons for Refusal of Japan Counterpart Application", issued on Sep. 30, 2025, with English translation thereof, p. 1-p. 10.

*Primary Examiner* — James A Shriver, II
*Assistant Examiner* — Ian Bryce Shelton
(74) *Attorney, Agent, or Firm* — JCIPRNET

(57) ABSTRACT

A vehicle includes a drive unit, a direction input device, a mode switching operator, and a control device. The drive unit is provided at a vehicle body frame and is capable of translating in all directions on a floor surface and turning. The direction input device receives a direction input. The mode switching operator receives a mode switching input. The control device is configured to: switch a travel mode of the drive unit between a translation mode and a turning mode based on the mode switching input, control the drive unit to translate with respect to the floor surface based on a signal from the direction input device when the translation mode is selected, and control the drive unit to turn with respect to the floor surface based on a signal corresponding to a left or right direction from the direction input device when the turning mode is selected.

14 Claims, 8 Drawing Sheets

(56) References Cited

U.S. PATENT DOCUMENTS

| | | | | |
|---|---|---|---|---|
| 11,523,952 | B2 * | 12/2022 | Lee | A61G 5/1067 |
| 2007/0080003 | A1 * | 4/2007 | Koerlin | G05G 9/047 180/907 |
| 2013/0018524 | A1 * | 1/2013 | Ankers | A61G 5/1089 701/1 |
| 2013/0253769 | A1 * | 9/2013 | Kamo | A61G 5/04 701/42 |
| 2013/0299254 | A1 * | 11/2013 | Mutoh | B62K 11/007 180/21 |
| 2013/0299261 | A1 * | 11/2013 | Muto | B62K 1/00 180/220 |
| 2014/0067182 | A1 * | 3/2014 | Kume | A61G 5/04 701/22 |
| 2016/0101664 | A1 * | 4/2016 | Richter | A61G 5/1081 701/49 |
| 2016/0313758 | A1 * | 10/2016 | Schmidt | G05G 9/047 |
| 2017/0266069 | A1 * | 9/2017 | Lozano | A61G 5/04 |
| 2018/0203522 | A1 * | 7/2018 | Stucki | B60L 50/60 |
| 2020/0121526 | A1 * | 4/2020 | Cooper | A61G 5/043 |
| 2020/0150709 | A1 * | 5/2020 | Schmidt | A61G 5/04 |
| 2020/0317049 | A1 * | 10/2020 | Raja | B62D 1/12 |
| 2020/0393866 | A1 * | 12/2020 | Schmidt | A61G 5/1051 |
| 2021/0077323 | A1 * | 3/2021 | Lee | A61G 5/1056 |
| 2021/0282991 | A1 | 9/2021 | Yada et al. | |
| 2022/0183920 | A1 * | 6/2022 | Raja | A61H 3/04 |
| 2022/0233377 | A1 * | 7/2022 | Raja | A61G 5/1051 |

FOREIGN PATENT DOCUMENTS

| | | | |
|---|---|---|---|
| JP | 2013237334 | 11/2013 | |
| JP | 2019045691 | 3/2019 | |
| JP | 2020169000 | 10/2020 | |
| JP | 2021146747 | 9/2021 | |
| WO | 2013080447 | 6/2013 | |
| WO | 2016163035 | 10/2016 | |
| WO | WO-2019244444 A1 * | 12/2019 | A61G 5/1075 |

* cited by examiner

VEHICLE

CROSS-REFERENCE TO RELATED APPLICATION

This application claims the priority benefit of Japan application serial no. 2022-042988, filed on Mar. 17, 2022. The entirety of the above-mentioned patent application is hereby incorporated by reference herein and made a part of this specification.

BACKGROUND

Technical Field

The disclosure relates to a vehicle capable of translating in a lateral direction and turning.

Related Art

Patent Document 1 (Japanese Patent Application Laid-Open No. 2020-169000) discloses an electric vehicle including left and right drive wheels, left and right electric motors for independently rotating the left and right drive wheels, and a joystick for instructing a movement direction. The joystick has a forward button and a backward button. A user may drive the vehicle forward or backward by pressing the forward button or the backward button. Further, the user may turn the vehicle by tilting the joystick.

In the case where an omni-directional movement device capable of translating in the lateral direction is used for the drive wheel, the vehicle is capable of both translating in the lateral direction and turning. In this case, the vehicle needs to receive and distinguish between an operation corresponding to translation in the lateral direction and an operation corresponding to turning. However, if an operator for receiving the operation corresponding to translation in the lateral direction and an operator for receiving the operation corresponding to turning are provided independently, the number of operators increases and the user's operation becomes complicated.

SUMMARY

An embodiment of the disclosure provides a vehicle (1) including a vehicle body frame (2), at least one drive unit (3), a direction input device (41C, 45), a mode switching operator (41D), and a control device (6). The drive unit is provided at the vehicle body frame and is capable of translating in all directions on a floor surface and capable of turning. The direction input device receives a direction input corresponding to at least front, rear, left, and right directions inputted by a user. The mode switching operator receives a mode switching input corresponding to mode switching performed by the user. The control device controls the drive unit based on signals from the direction input device and the mode switching operator. The control device is configured to: switch a travel mode of the drive unit between a translation mode and a turning mode based on the mode switching input, control the drive unit so that the drive unit translates with respect to the floor surface based on a signal from the direction input device when the translation mode is selected, and control the drive unit so that the drive unit turns with respect to the floor surface based on a signal corresponding to a left or right direction from the direction input device when the turning mode is selected.

According to the above configuration, it is possible to facilitate the user's operation for translation in the lateral direction and turning in a vehicle.

DESCRIPTION OF THE EMBODIMENTS

Figure 1:
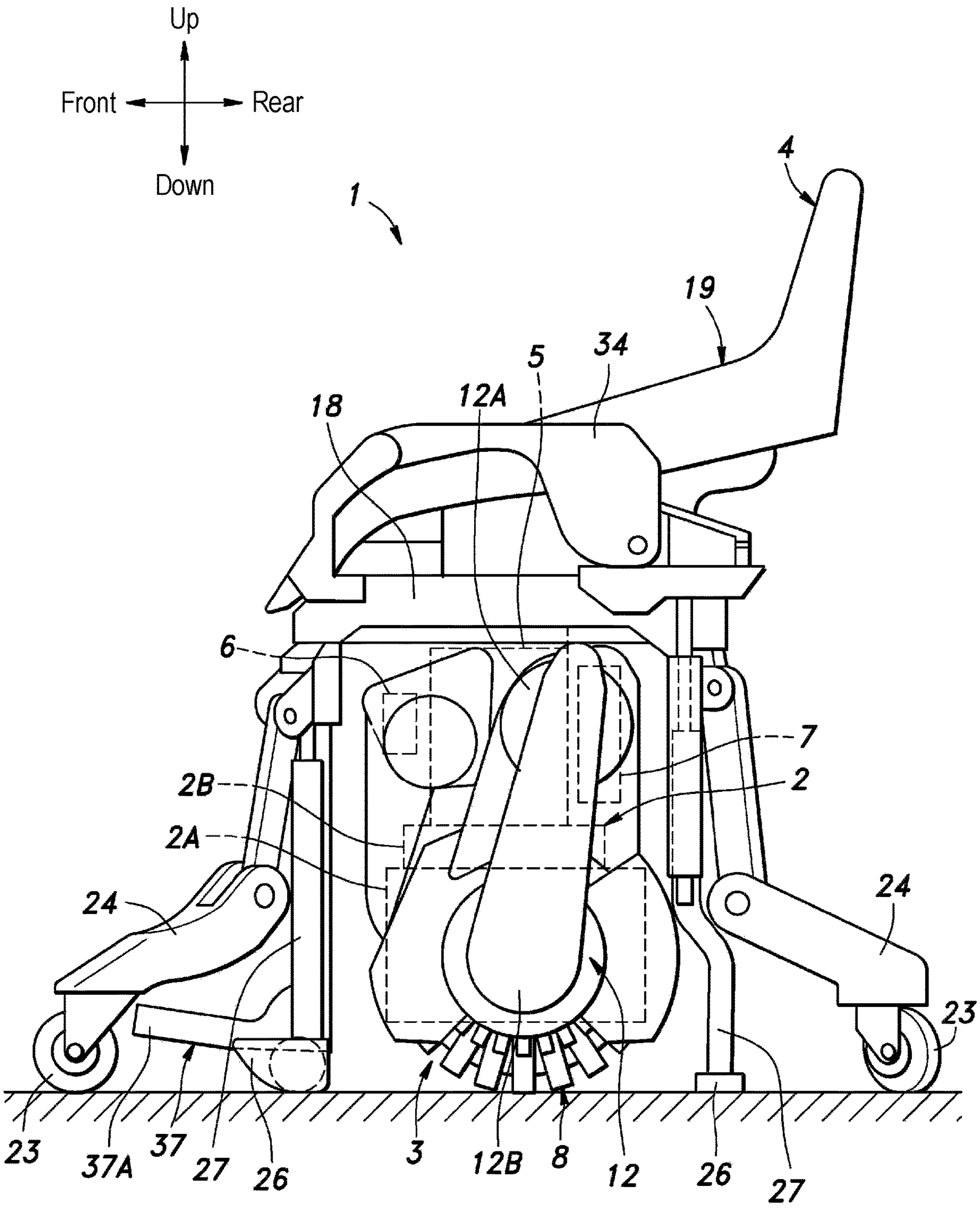
FIG. 1 is a side view of a vehicle when a seat is at a low position, as viewed from the left side.

Embodiments of the disclosure facilitate a user's operation for translation in the lateral direction and turning in a vehicle.

An embodiment of the disclosure provides a vehicle (1) including a vehicle body frame (2), at least one drive unit (3), a direction input device (41C, 45), a mode switching operator (41D), and a control device (6). The drive unit is provided at the vehicle body frame and is capable of translating in all directions on a floor surface and capable of turning. The direction input device receives a direction input corresponding to at least front, rear, left, and right directions inputted by a user. The mode switching operator receives a mode switching input corresponding to mode switching performed by the user. The control device controls the drive unit based on signals from the direction input device and the mode switching operator. The control device is configured to: switch a travel mode of the drive unit between a translation mode and a turning mode based on the mode switching input, control the drive unit so that the drive unit translates with respect to the floor surface based on a signal from the direction input device when the translation mode is selected, and control the drive unit so that the drive unit turns with respect to the floor surface based on a signal corresponding to a left or right direction from the direction input device when the turning mode is selected.

According to this embodiment, the user can select a travel mode by operating the mode switching switch and move the vehicle according to the selected travel mode by using the direction input device. Accordingly, the user can perform operation distinguishing the translation mode and the turning mode, and the operation becomes easy. Further, a common operator can serve to instruct the translation direction and the turning direction of the vehicle.

In the above embodiment, the direction input device may be a joystick.

According to this embodiment, it is possible to facilitate the user's operation on the vehicle.

In the above embodiment, the mode switching operator may be a push switch.

According to this embodiment, it is possible to facilitate the user's operation on the vehicle.

In the above embodiment, the direction input device and the mode switching operator may be a common joystick. The joystick may output a signal corresponding to the direction input when receiving a tilt operation performed by the user, and output a signal corresponding to the mode switching input when receiving a push-in operation at a neutral position performed by the user.

According to this embodiment, since the user can operate the movement direction and the travel mode of the vehicle by operating the joystick, the operation becomes easy. Further, the number of operators can be reduced.

In the above embodiment, the direction input device may be a gravity center movement detection device which detects gravity center movement of an entirety including the vehicle and the user on board the vehicle, and outputs a signal corresponding to a direction of the gravity center movement.

According to this embodiment, it is possible to move the vehicle in any direction by moving the user's center of gravity.

In the above embodiment, the gravity center movement detection device may be a tilt angle sensor (45) which is provided at the vehicle body frame and detects a tilt angle of the vehicle body frame.

According to this embodiment, the operating direction of the vehicle can be acquired by the tilt angle sensor.

In the above embodiment, the vehicle may further include an indicator (43) for indicating the travel mode being executed.

According to this embodiment, the user can look at the indicator and recognize the selected travel mode.

In the above embodiment, the drive unit may be provided as a pair of left and right drive units. Each of the drive units may include a pair of drive disks (10), a plurality of drive rollers (11), a pair of actuators (12), and a drive wheel (8). The pair of drive disks are rotatably supported by the vehicle body frame and are arranged coaxially and opposed to each other. The plurality of drive rollers are rotatably supported by the drive disk. The pair of actuators respectively rotate the pair of drive disks independently. The drive wheel has an annular shape, is arranged coaxially with the drive disks between the pair of drive disks, is in contact with the plurality of drive rollers, and is rotatable around a central axis and around an annular axis.

According to this embodiment, it is possible to provide a travel unit capable of translating in all directions and turning.

According to the above configuration, it is possible to facilitate the user's operation for translation in the lateral direction and turning in a vehicle.

An embodiment of a vehicle according to the disclosure will be described below with reference to the drawings. In this embodiment, the vehicle is configured as an inverted pendulum type vehicle.

Figure 2:
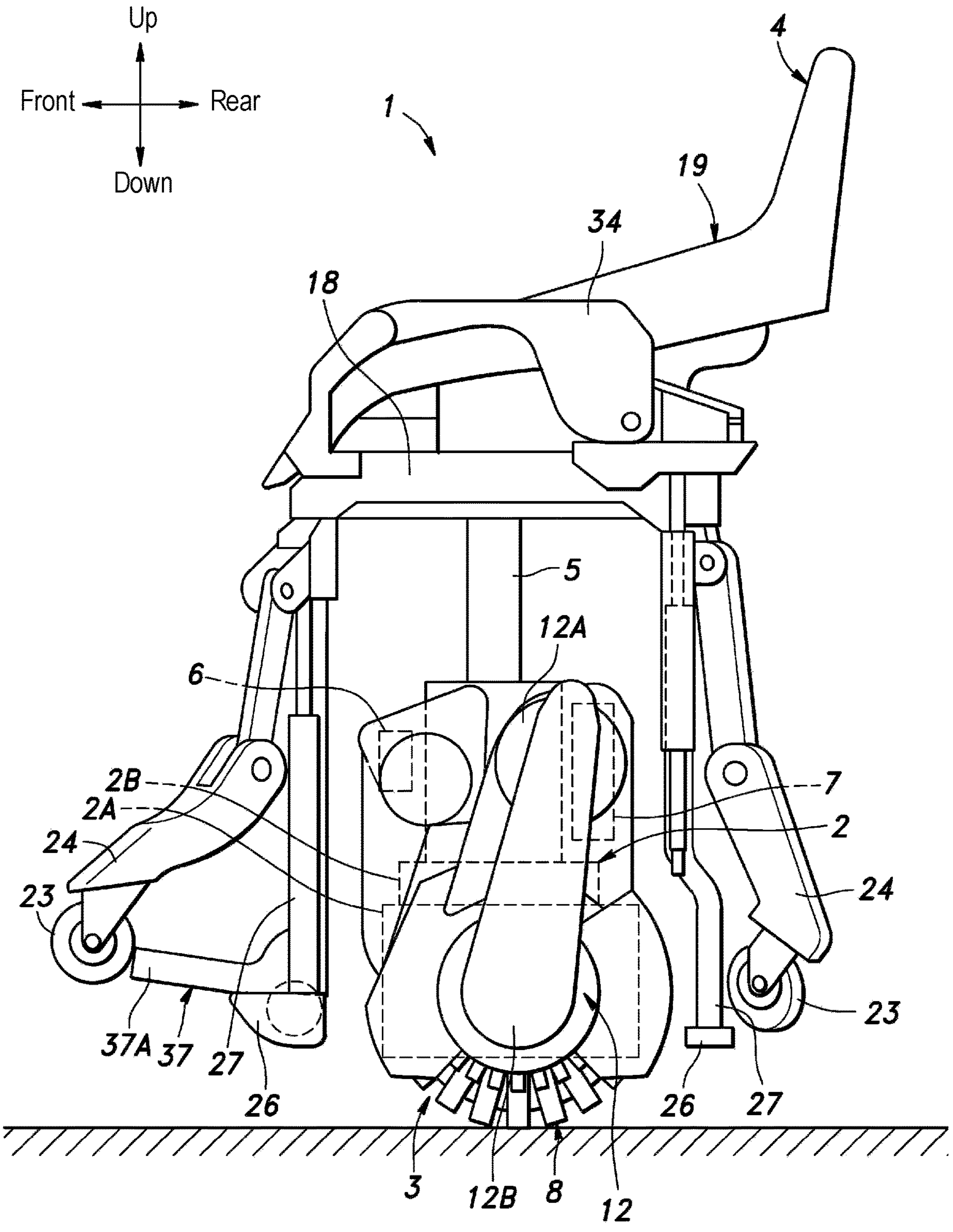
FIG. 2 is a side view of the vehicle when the seat is at a high position, as viewed from the left side.

As shown in FIG. 1 and FIG. 2, a vehicle 1 includes a vehicle body frame 2, at least one drive unit 3 provided at the vehicle body frame 2 and movable on a floor surface, a seat 4 arranged above the vehicle body frame 2 and supporting the hips of a user, a lifting apparatus 5 provided between the vehicle body frame 2 and the seat 4, a control device 6 that controls the drive unit 3 and the lifting apparatus 5, and a battery 7 provided at the vehicle body frame 2.

The vehicle body frame 2 includes a lower frame 2A and an upper frame 2B connected to an upper part of the lower frame 2A. The upper frame 2B is connected to the lower frame 2A rotatably around a rotating shaft extending in the front-rear direction.

Figure 3:
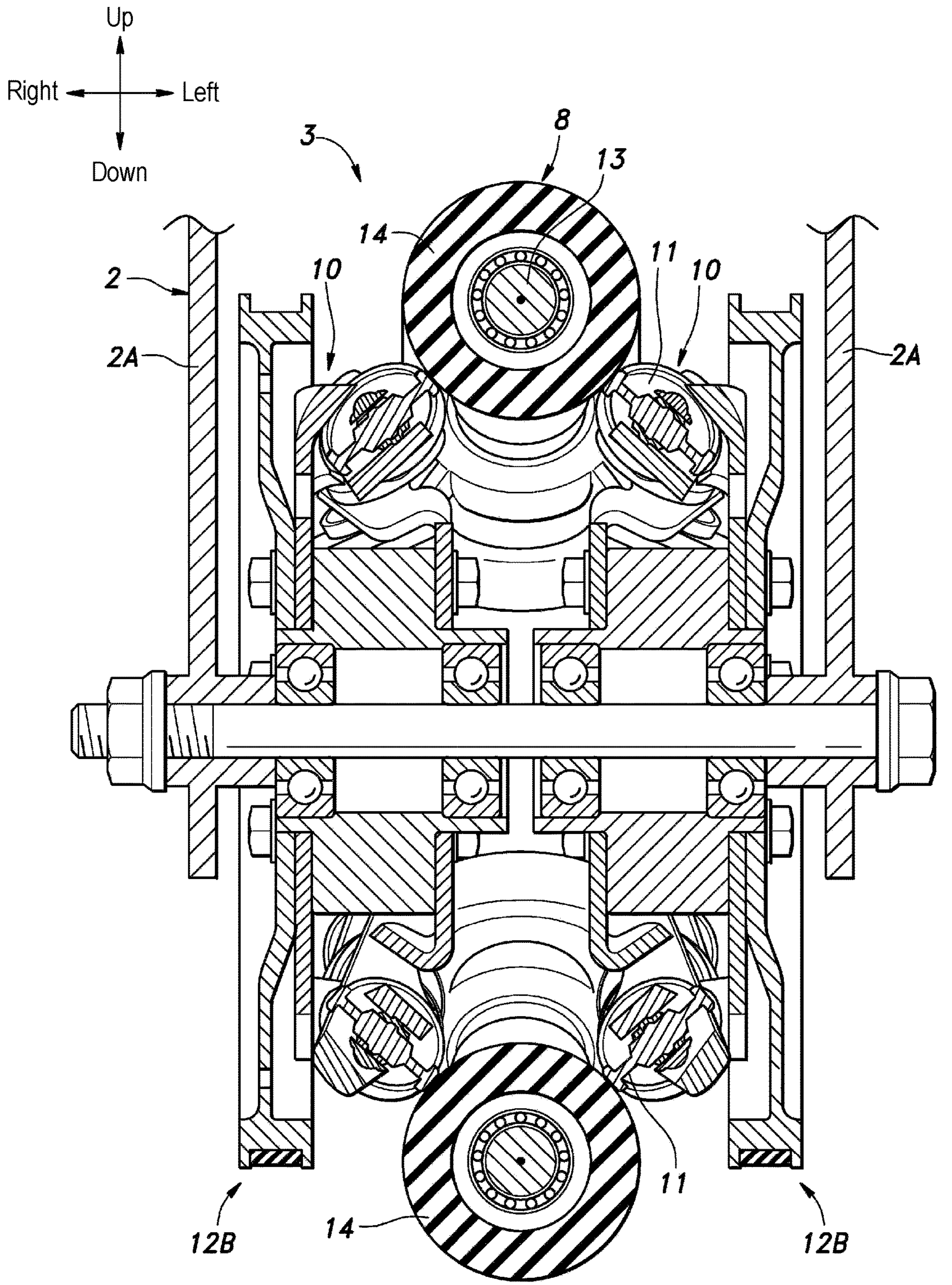
FIG. 3 is a cross-sectional view of a drive unit.

In this embodiment, a pair of left and right drive units 3 are provided at left and right side parts of the lower frame 2A. Each drive unit 3 has an inverted pendulum-controlled drive wheel 8. In this embodiment, each drive unit 3 is a friction-type drive device movable in all directions along the floor surface. As shown in FIG. 3, the friction-type drive device includes a pair of drive disks 10 rotatably supported by the lower frame 2A, a plurality of drive rollers 11 rotatably supported by each of the drive disks 10, a drive wheel 8 in an annular shape arranged between the left and right drive disks 10 and in contact with the drive rollers 11, and a pair of actuators 12 that respectively rotate the pair of drive disks 10 independently. The pair of drive disks 10 are arranged coaxially with each other, and their rotation axes extend in the left-right direction. The plurality of drive rollers 11 are arranged at intervals in the circumferential direction at an outer periphery of the drive disks 10 and are each rotatably supported around an axis inclined with respect to the circumferential direction of the drive disk 10.

Figure 7:
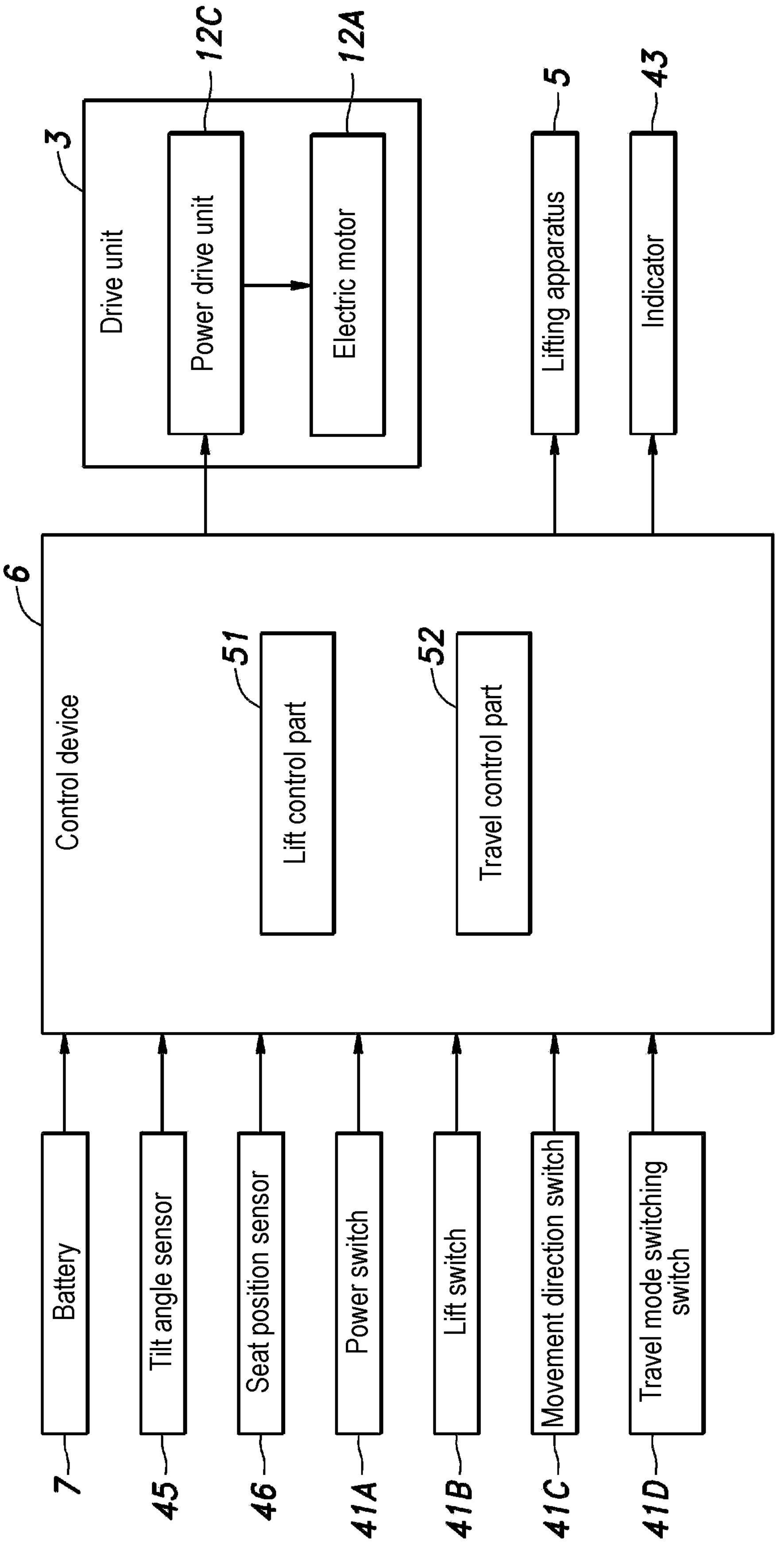
FIG. 7 is a block diagram showing a configuration of a control device.

As shown in FIG. 1, each actuator 12 includes an electric motor 12A and a transmission mechanism 12B that transmits the rotational force of the electric motor 12A to the corresponding drive disk 10. The transmission mechanism 12B may be, for example, a belt transmission mechanism. The electric motor 12A may be arranged above the drive disk 10. The drive unit 3 includes a power drive unit 12C (shown in FIG. 7) that supplies electric power to the electric motor 12A.

As shown in FIG. 1 and FIG. 3, the drive wheel 8 has an annular shape and is arranged coaxially with the drive disks 10 between the pair of drive disks 10. Further, the drive wheel 8 is in contact with the plurality of drive rollers 11 and is rotatable around a central axis and around an annular axis. The drive wheel 8 includes, for example, a core 13 in an annular shape and a plurality of driven rollers 14 rotatably supported by the core 13. Each driven roller 14 is supported by the core 13 rotatably around the axis of the core 13 in an annular shape. Each driven roller 14 receives a load from the drive disks 10 and rotates with respect to the core 13.

When the pair of drive disks 10 rotate in the same direction at the same rotational speed, the drive wheel 8 rotates in the same direction at the same rotational speed as the drive disks 10. When a difference is generated in the rotational direction or the rotational speed of the pair of drive disks 10, the driven rollers 14 of the drive wheel 8 rotate with respect to the core 13. Accordingly, the drive unit 3 can generate a propulsive force in the left-right direction with respect to the floor surface.

The battery 7 is supported at a rear part of the lower frame 2A. The control device 6 is supported at an inner part or a rear part of the lower frame 2A.

The lifting apparatus 5 is an apparatus for lifting and lowering the seat 4 between a low position and a high position. The seat 4 includes a seat frame 18 supported by the lifting apparatus 5 and a pad 19 supported at an upper part of the seat frame 18. A user may sit on the pad 19. The lifting apparatus 5 is coupled to the upper frame 2B of the vehicle body frame 2 and the seat frame 18. The lifting apparatus 5 displaces the seat frame 18 in the up-down direction with respect to the upper frame 2B of the vehicle body frame 2 by expanding and contracting in the up-down direction. The lifting apparatus 5 may be, for example, a ball screw mechanism or a rack and pinion mechanism driven by an electric motor, or may be a linear motor. Further, the lifting apparatus 5 may be an air cylinder that expands and contracts by compressed air from a compressor.

The lifting apparatus 5 may include, for example, a base supported by the upper frame 2B, a movable body that is provided at the base movably in the up-down direction and is coupled to the seat frame 18, a ball screw mechanism that moves the movable body with respect to the base, and an electric motor that drives the ball screw mechanism.

As shown in FIG. 2, the high position of the seat 4 may be positioned vertically above the low position of the seat 4. In another embodiment, the high position of the seat 4 may be laterally offset with respect to the low position of the seat 4.

Figure 4:
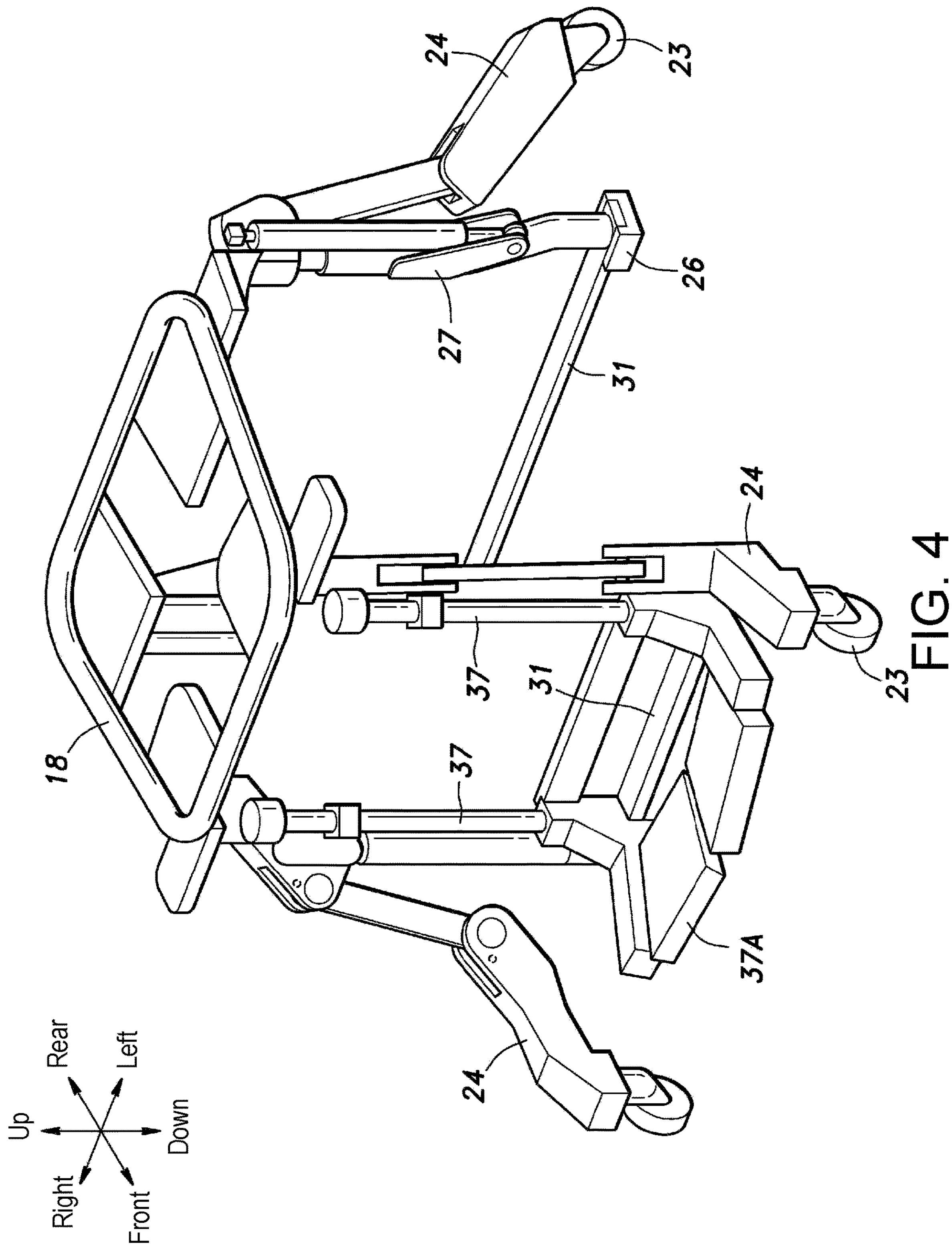
FIG. 4 is a perspective view of a seat frame assembly.

As shown in FIG. 4, the seat frame 18 is formed in a rectangular frame shape in a plan view. The seat frame 18 is coupled to an upper end of the lifting apparatus 5. The seat frame 18 supports the pad 19 from below.

The vehicle 1 includes at least one first leg 24 extending downward from the seat 4 and having a roller 23 at its lower end, and at least one second leg 27 extending downward from the seat 4 and having an abutment member 26 at its lower end. In this embodiment, the vehicle 1 includes four first legs 24 and four second legs 27. Each first leg 24 and each second leg 27 are rotatably coupled to the seat frame 18. Each first leg 24 has a configuration similar to each other, and each second leg 27 has a configuration similar to each other.

The first leg 24 is rotatable between a retracted position arranged close to the vehicle body frame 2 and an unfolded position more laterally away from the vehicle body frame 2 than the retracted position. The first leg 24 may have a joint at a middle part in the longitudinal direction.

The roller 23 is rotatably coupled to a lower end of the first leg 24. The roller 23 may be a caster having a rotating shaft rotating around a vertical axis with respect to the first leg 24. In another embodiment, a ball may be supported at the lower end of the first leg 24 instead of the roller 23.

The first leg 24 has a biasing member (not shown) that biases the first leg 24 from the unfolded position toward the retracted position. The first leg 24 may have a damper that dampens rotation. The damper may be a rotary damper or a piston damper.

The second leg 27 is expandable and contractable in the up-down direction and biased in the extending direction. The abutment member 26 is provided at a lower end of the second leg 27. The abutment member 26 may have a higher flexibility than the second leg 27. Further, the abutment member 26 may have a coefficient of friction higher than the second leg 27. The abutment member 26 may be made of rubber or elastomer, for example. With grounding of the abutment member 26, the vehicle 1, which is grounded via the roller 23, can be kept in a stop state. With the frictional force between the floor surface and the abutment member 26 provided at the lower end of the second leg 27, the vehicle 1 is kept in the stop state. Since the vehicle 1 is kept in the stop state by the frictional force between the abutment member 26 and the floor surface, there is no need to supply power to the drive unit 3, and energy efficiency can be improved. Further, by stopping the vehicle 1, the gravity center position of the vehicle 1 can be easily determined when the seat 4 is moved to the high position and inverted pendulum control is started.

The second leg 27 is biased in the extending direction by a biasing member. The biasing member may be a compression coil spring. The second leg 27 may have a damper that dampens the expansion and contraction motion. The damper may be a piston damper. The lower parts of two adjacent second legs 27 are connected to each other by a connecting member 31.

As shown in FIG. 2, when the seat 4 is at the high position, each roller 23 and each abutment member 26 are separated from the floor surface. When the seat 4 is at the high position, the lower end of each abutment member 26 is arranged lower than the lower end of each roller 23. As shown in FIG. 1, when the seat 4 is at the low position, each roller 23 and each abutment member 26 are in contact with the floor surface. When the seat 4 moves from the high position to the low position, each abutment member 26 contacts the floor surface earlier than each roller 23. Accordingly, when the seat 4 moves to the low position, the vehicle 1 can be brought to the stop state at an early stage.

Each first leg 24 is pushed against the floor surface and moves from the retracted position to the unfolded position. Accordingly, the distance between the grounding points of the first legs 24 is widened, and the posture of the vehicle 1 at the low position is stabilized.

Each second leg 27 is connected to a lever 34 via a transmission mechanism. In this embodiment, a pair of left and right levers 34 are provided at left and right side parts of the seat 4. When the seat 4 is at the low position, according to the user's operation on the lever 34, the second leg 27 can be moved to the retracted position. Accordingly, when the seat 4 is at the low position, the abutment member 26 is separated from the floor surface and the vehicle 1 is capable of traveling.

As shown in FIG. 4, the vehicle 1 includes at least one support member 37 extending downward from the seat 4. The support member 37 includes a footrest 37A supporting the user's foot soles at its lower part. The support member 37 and the footrest 37A are separated from the floor surface regardless of the position of the seat 4.

Figure 5:
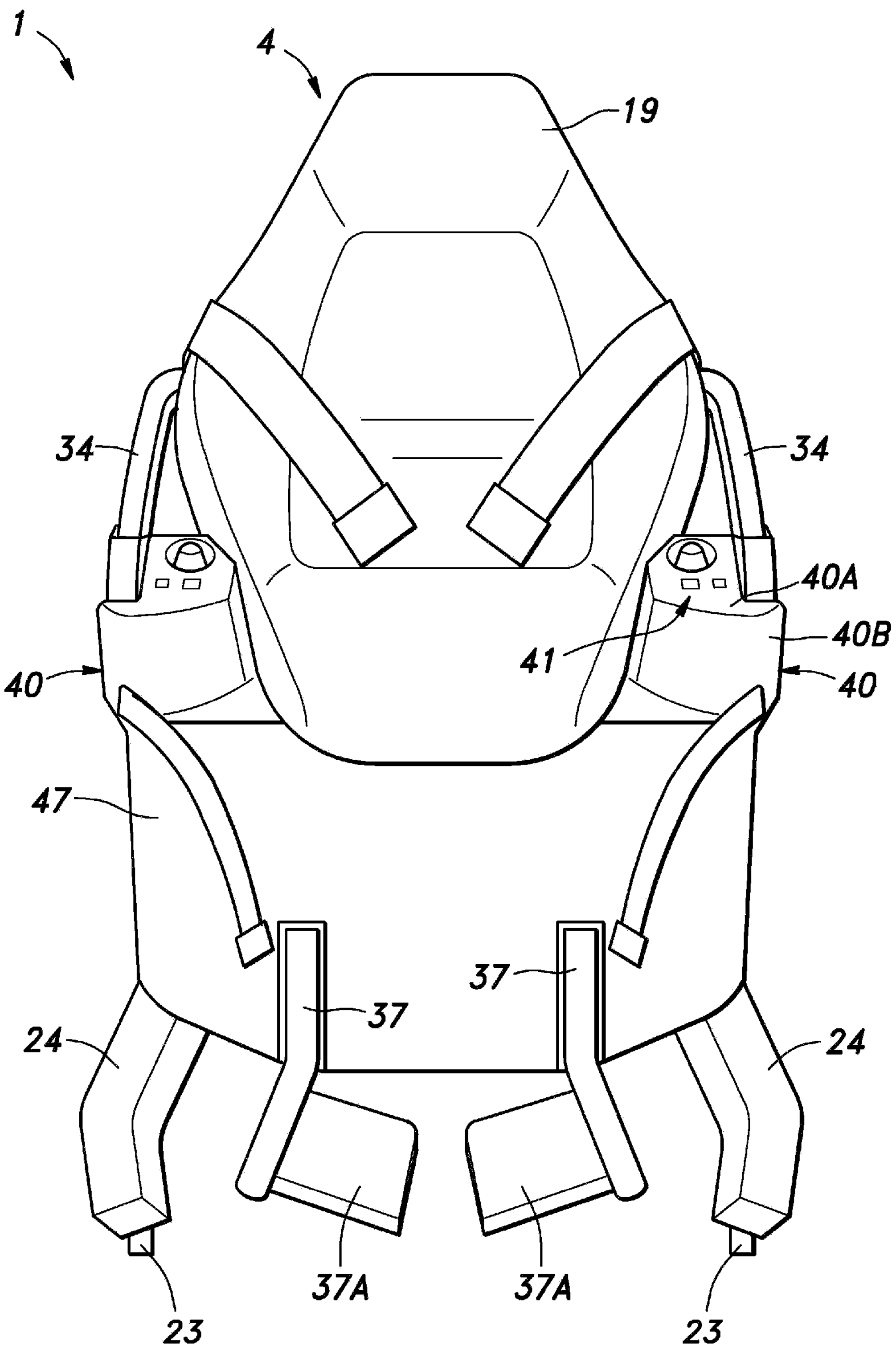
FIG. 5 is a perspective view of the vehicle as viewed from upper front side.
Figure 6:
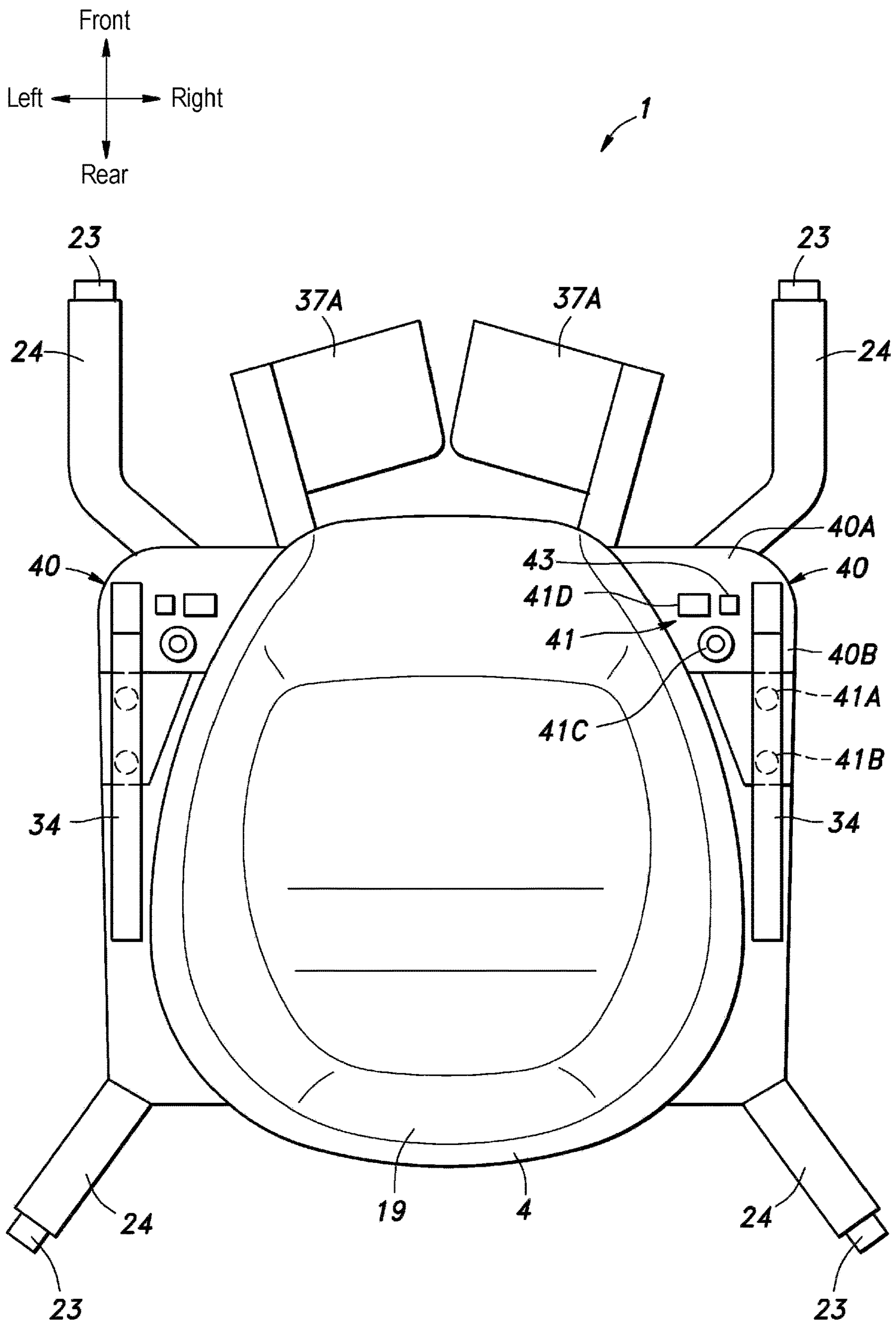
FIG. 6 is a plan view of the vehicle.

As shown in FIG. 5 and FIG. 6, the vehicle 1 includes an operating device 40 provided at at least one of a left side part and a right side part of the seat 4. In this embodiment, the operating device 40 is provided at both the left side part and the right side part of the seat 4. Accordingly, even if the user has a disability in one of the left and right hands, the user can operate the vehicle 1 with the other hand. The left and right operating devices 40 may have the same configuration.

The operating device 40 includes an operation panel 40B having an operation surface 40A facing upward, and a plurality of operators 41 provided on the operation surface 40A. The lever 34 forms part of the operating device 40 and extends upward and forward from a rear part of the operation panel 40B. The operation panel 40B may be supported by the seat frame 18. The operation panel 40B extends in the front-rear direction along a side part of the pad 19.

As shown in FIG. 6, the plurality of operators 41 include a power switch 41A, a lift switch 41B, a movement direction switch 41C (direction input device), and a travel mode switching switch 41D (mode switching operator). The power switch 41A, the lift switch 41B, the movement direction switch 41C, and the travel mode switching switch 41D may be provided at each of the left and right operating devices 40. The plurality of operators 41 are connected to the control device 6.

The movement direction switch 41C is a switch for operating the drive unit 3. The movement direction switch 41C is an operator that receives the user's direction input corresponding to at least the front, rear, left, and right directions. The movement direction switch 41C may be a joystick. In another embodiment, the movement direction switch 41C may be four button switches corresponding to the front, rear, left, and right directions. The movement direction switch 41C receives any direction along a horizontal plane including the front, rear, left, and right directions, and an operation amount in that direction. The movement direction switch 41C outputs, to the control device 6, a signal corresponding to a front-rear component which is an operation amount in the front-rear direction and a left-right component which is an operation amount in the left-right direction.

The travel mode switching switch 41D is an operator that receives a mode switching input corresponding to mode switching performed by the user. The travel mode switching switch 41D may be a push switch.

The operation surface 40A is provided with an indicator 43 for indicating a travel mode being executed. The indicator 43 may include a first light emitting part corresponding to a translation mode and a second light emitting part corresponding to a turning mode. Further, the indicator 43 may change an emitted light color according to the selected travel mode. The indicator 43 may be a display provided on the operation surface 40A.

At least one of the plurality of operators 41 may display the state of the vehicle 1 by lighting. For example, the power switch 41A may emit light when the vehicle 1 is powered on, i.e., in a startup state. Further, the lift switch 41B may emit light when the lifting apparatus 5 is being driven. Further, the lift switch 41B may change the emitted light color according to the position of the seat 4. Further, the travel mode switching switch 41D may change the emitted light color according to the selected travel mode.

The vehicle 1 has a gravity center movement detection device as a direction input device. The gravity center movement detection device detects gravity center movement of an entirety including the vehicle 1 and the user on board the vehicle 1, and outputs a signal corresponding to a direction of the gravity center movement. In this embodiment, the gravity center movement detection device is a tilt angle sensor 45. The tilt angle sensor 45 is provided at the vehicle body frame 2 and acquires a tilt angle of the vehicle body frame 2 with respect to the horizontal plane. The tilt angle sensor 45 may be a gyro sensor. The tilt angle sensor 45 may be configured by a known device that sequentially measures (estimates) a vehicle body tilt angle by detecting acceleration and angular velocity in three axial directions and performing strapdown type arithmetic processing. However, the tilt angle sensor 45 is not limited to this form. For example, the tilt angle sensor 45 may be a sensor that detects the vehicle body tilt angle based on changes in the direction of gravitational acceleration with respect to the vehicle body frame 2. In that case, the tilt angle sensor 45 may be configured by a known device based on MEMS technology.

The tilt angle sensor 45 is provided at the upper frame 2B of the vehicle body frame 2. In another embodiment, the tilt angle sensor 45 may be provided at the seat frame 18.

The vehicle 1 includes a seat position sensor 46 that detects the position of the seat 4 with respect to the vehicle body frame 2. The seat position sensor 46 at least detects that the seat 4 is at the low position and the high position. The seat position sensor 46 may be, for example, a proximity switch or a contact switch. Further, the seat position sensor 46 may acquire the position of the seat 4 based on the expansion and contraction state of the lifting apparatus 5. The seat position sensor 46 is connected to the control device 6.

An outer shell 47 may be attached to a lower part of the vehicle 1. Each second leg 27, each support member 37, and the upper part of each first leg 24 may be arranged inside the outer shell 47. The lower end of the first leg 24 and the footrest 37A may protrude outside the outer shell 47.

The control device 6 is an arithmetic device having a microprocessor (MPU), a nonvolatile memory, a volatile memory, and an interface. The control device 6 implements various applications by the microprocessor executing programs stored in the nonvolatile memory. The control device 6 includes a lift control part 51 and a travel control part 52. The lift control part 51 controls the lifting apparatus 5. The travel control part 52 controls the electric motors 12A of the left and right drive units 3.

When the seat 4 is at the high position, the control device 6 controls the left and right drive units 3 based on inverted pendulum control. Accordingly, the tilt angle of the vehicle body frame 2 is kept at 0 degrees. When the tilt angle of the vehicle body frame 2 is 0 degrees, the center of gravity of the vehicle 1 is positioned vertically above the rotation axis of the left and right drive wheels 8. Further, based on the tilt angle of the vehicle body frame 2, the control device 6 drives the drive units 3 to translate or turn in the same direction as the tilt angle. Accordingly, the user seated on the seat 4 can move the vehicle 1 in any direction by shifting the weight.

When the seat 4 is at the low position, the control device 6 controls the drive units 3 based on the signal from the movement direction switch 41C to cause the vehicle 1 to travel. The control device 6 does not perform inverted pendulum control when the seat 4 is at the low position.

The control device 6 turns on/off the power of the vehicle 1 according to the user's operation on the power switch 41A. The control device 6 drives the lifting apparatus 5 to lift and lower the seat 4 according to the user's operation on the lift switch 41B.

In the drive unit 3, when the pair of drive disks 10 rotate in the same direction at the same rotational speed, the drive wheel 8 rotates together with the pair of drive disks 10. That is, the drive wheel 8 rotates forward or backward around the rotation axis of the drive disks 10. At this time, the drive rollers 11 of the drive disks 10 and the driven rollers 14 of the drive wheel 8 do not rotate with respect to the core 13. In the drive unit 3, when a rotational speed difference is generated between the pair of drive disks 10, with respect to the circumferential (tangential) force caused by the rotation of the pair of drive disks 10, a component force perpendicular to this force acts on the driven rollers 14 of the drive wheel 8 from the left and right drive rollers 11. Since the axis of the drive roller 11 is inclined with respect to the circumferential direction of the drive disk 10, a force component is generated between the drive disks 10 due to the rotational speed difference. Due to this component force, the drive rollers 11 rotate with respect to the drive disks 10, and the driven rollers 14 rotate with respect to the core 13. Accordingly, the drive wheel 8 generates a drive force in the left-right direction.

With the left and right drive units 3 rotating forward at the same speed, the vehicle 1 moves forward. With the left and right drive units 3 rotating backward at the same speed, the vehicle 1 moves backward. With a speed difference generated in the rotation in the front-rear direction of the left and right drive units 3, the vehicle 1 turns rightward or leftward. With the rotation of the driven rollers 14 of each drive wheel 8 of the left and right drive units 3, the vehicle 1 translates rightward or leftward.

When the user presses the travel mode switching switch 41D, the control device 6 switches the travel mode between a translation mode and a turning mode based on the signal from the travel mode switching switch 41D. When the user operates the movement direction switch 41C, the control device 6 controls the drive units 3 based on the movement direction switch 41C.

Figure 8:
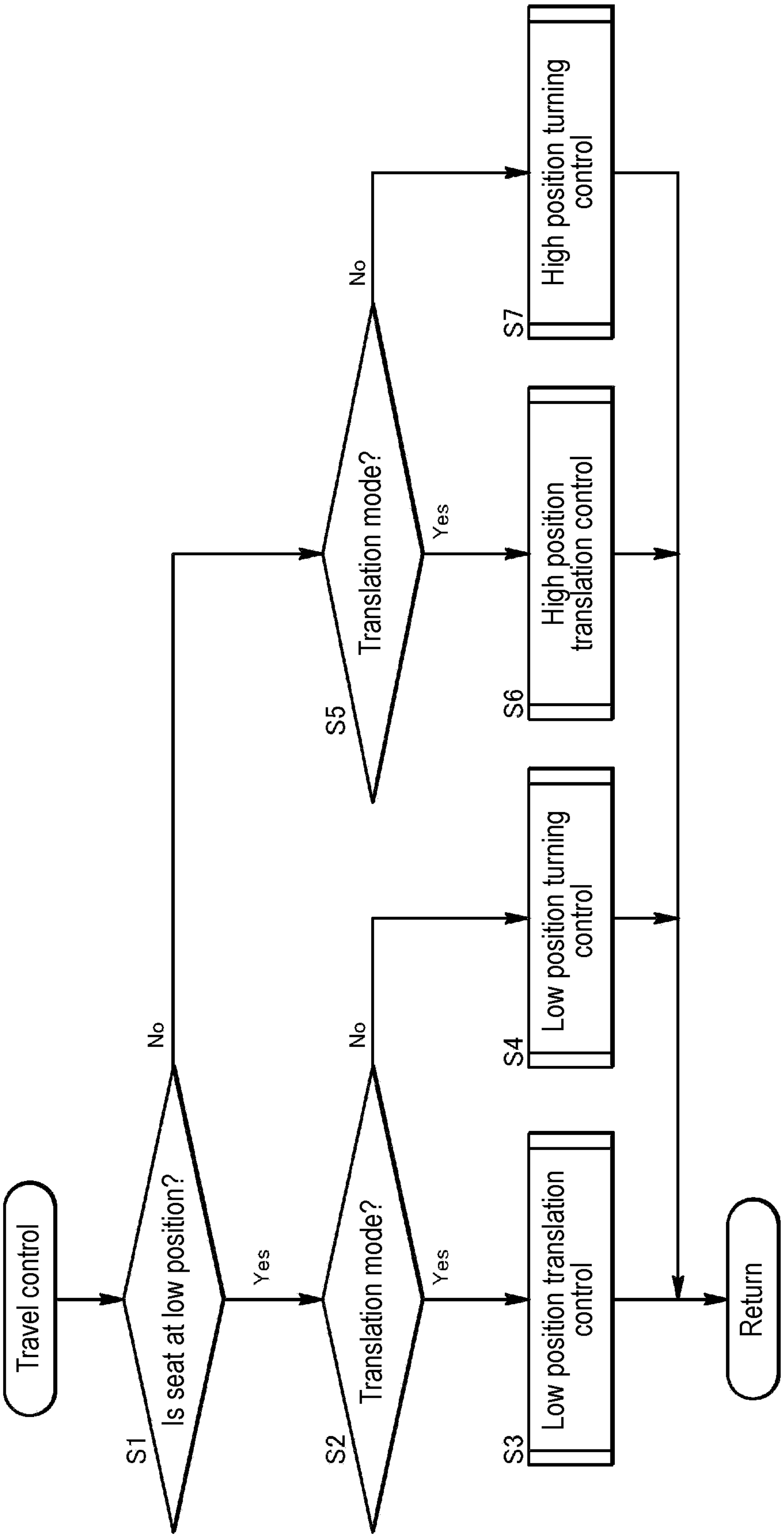
FIG. 8 is a flowchart showing a process of travel control.

A method of controlling each drive unit by the control device 6 will be described. When the translation mode is selected, the control device 6 controls the drive units 3 so that the drive units 3 translate with respect to the floor surface based on the signal from the movement direction switch 41C. Further, when the turning mode is selected, the control device 6 controls the drive units 3 so that the drive units 3 turn with respect to the floor surface based on the signal corresponding to left or right direction from the movement direction switch 41C. The specific control process will be illustrated below. FIG. 8 is a flowchart showing a process of travel control executed by the control device 6. In the travel control, the control device 6 first determines whether the seat 4 is at the low position based on the signal from the seat position sensor 46 (S1). If the seat 4 is at the low position (the determination result in S1 is "Yes"), it is determined whether the travel mode is the translation mode (S2). If the travel mode is the translation mode (the determination result in S2 is "Yes"), the control device 6 executes low position translation control (S3). If it is determined in step S2 that the travel mode is not the translation mode (the determination result in S2 is "No"), the control device 6 executes low position turning control (S4).

If it is determined in step S1 that the seat 4 is not at the low position (the determination result in S1 is "No"), it is determined whether the travel mode is the translation mode (S5). If the travel mode is the translation mode (the determination result in S5 is "Yes"), the control device executes high position translation control (S6). If it is determined in step S5 that the travel mode is not the translation mode (the determination result in S5 is "No"), the control device 6 executes high position turning control (S7).

In the low position translation control, the control device 6 sets a same drive amount (control amount) for the left and right drive units 3. Accordingly, the left and right drive units 3 move in the same direction.

In the low position translation control, the control device 6 sets a front-rear speed target value and a left-right speed target value based on the signal from the movement direction switch 41C. Specifically, the control device 6 sets the front-rear speed target value based on a front-rear component of the signal received from the movement direction switch 41C, and sets the left-right speed target value based on a left-right component. Next, the control device 6 sets a first target rotational speed of the left and right drive disks 10 based on the front-rear speed target value. A same value is set as the first target rotational speed for the left and right drive disks 10. Next, the control device 6 sets a second target rotational speed of the left and right drive disks 10 based on the left-right speed target value. Different values are set as the second target rotational speed for the left and right drive disks 10. Since the second target rotational speed is different for the left and right drive disks 10, a rotational speed difference is generated between the left and right drive disks 10, and the driven rollers 14 rotate with respect to the core 13. Subsequently, the first target rotational speed and the second target rotational speed are added for the left and right drive disks 10 respectively to set a target rotational speed of the left-side drive disks 10 and a target rotational speed of the right-side drive disks 10. Then, the control device 6 controls the left-side electric motors 12A based on the target rotational speed of the left-side drive disks 10, and controls the right-side electric motors 12A based on the target rotational speed of the right-side drive disks 10.

In the low position turning control, the control device 6 sets different drive amounts (control amounts) for the left and right drive units 3. Further, the control device 6 sets a same target rotational speed for the left and right drive disks 10 of the left-side drive unit 3, and sets a same target rotational speed for the left and right drive disks 10 of the right-side drive unit 3. Accordingly, rotation of the driven rollers 14 with respect to the core 13 is not generated in each drive unit 3. Accordingly, translation in the left-right direction is not generated.

In the low position turning control, the control device 6 sets a front-rear speed target value and a left-right turning amount target value based on the signal from the movement direction switch 41C. Specifically, the control device 6 sets the front-rear speed target value based on a front-rear component of the signal received from the movement direction switch 41C, and sets the left-right turning amount target value based on a left-right component. Next, the control device 6 sets a first target rotational speed of the left and right drive disks 10 of the left and right drive units 3 based on the front-rear speed target value. A same value is set as the first target rotational speed for each drive disk 10 of the left and right drive units 3. Next, the control device 6 sets a second target rotational speed of the left and right drive disks 10 of the left and right drive units 3 based on the left-right turning amount target value. A same value is set as the second target rotational speed for each drive disk 10 of the left-side drive unit 3, a same value is set as the second target rotational speed for each drive disk 10 of the right-side drive unit 3, and different values are set as the second target rotational speed between each drive disk 10 of the left-side drive unit 3 and each drive disk 10 of the right-side drive unit 3. Accordingly, a difference is generated in the movement amount in the front-rear direction of the left and right drive units 3, and the vehicle 1 turns. Subsequently, the first target rotational speed and the second target rotational speed are added for the left and right drive disks 10 respectively to set a target rotational speed of the left-side drive disks 10 and a target rotational speed of the right-side drive disks 10. Then, the control device 6 controls the left-side electric motors 12A based on the target rotational speed of the left-side drive disks 10, and controls the right-side electric motors 12A based on the target rotational speed of the right-side drive disks 10.

In the high position translation control, the control device 6 sets a front-rear speed target value and a left-right speed target value based on the signal from the tilt angle sensor 45. Specifically, the control device 6 sets the front-rear speed target value based on a tilt angle in the front-rear direction of the signal received from the tilt angle sensor 45, and sets the left-right speed target value based on a tilt angle in the left-right direction. After setting the front-rear speed target value and the left-right speed target value, the same process as the low position translation control is performed to set a target rotational speed of each drive disk 10.

In the high position turning control, the control device 6 sets a front-rear speed target value and a left-right turning amount target value based on the signal from the tilt angle sensor 45. Specifically, the control device 6 sets the front-rear speed target value based on a tilt angle in the front-rear direction of the signal received from the tilt angle sensor 45, and sets the left-right turning amount target value based on a tilt angle in the left-right direction. After setting the front-rear speed target value and the left-right turning amount target value, the same process as the low position turning control is performed to set a target rotational speed of each drive disk 10.

According to the vehicle 1 described above, the user can select a travel mode by operating the travel mode switching switch 41D and move the vehicle 1 according to the selected travel mode by operating the movement direction switch 41C. Accordingly, the user can perform operation distinguishing the translation mode and the turning mode, and the operation becomes easy. Further, a common operator can serve to instruct the translation direction and the turning direction of the vehicle 1.

Since the indicator 43 indicates the travel mode being executed, the user can look at the indicator 43 and recognize the selected travel mode.

Although the specific embodiment has been described above, the disclosure is not limited to the above embodiment and may be extensively modified and implemented. For example, a joystick that constitutes the movement direction switch 41C may have a grip part that is held by the palm of the hand. In this case, the travel mode switching switch 41D may be provided at the grip part of the joystick. Accordingly, the user can operate the travel mode switching switch 41D while gripping the joystick. The travel mode switching switch 41D may be provided at a tip of the grip part.

The movement direction switch 41C and the travel mode switching switch 41D may be configured by a common joystick. In this case, the joystick may be configured to output a signal corresponding to a direction input when receiving the user's tilt operation, and output a signal corresponding to a travel mode switching input when receiving the user's push-in operation at a neutral position. According to this embodiment, since the user can operate the movement direction and the travel mode of the vehicle 1 by operating the joystick, the operation becomes easy. Further, the number of operators can be reduced.

What is claimed is:

1. A vehicle comprising:

a vehicle body frame;

a seat arranged above the vehicle body frame and supporting hips of a user;

a lifting apparatus provided between the vehicle body frame and the seat, for lifting and lowering the seat between a low position and a high position;

a seat position sensor that detects a position of the seat with respect to the vehicle body frame;

at least one drive unit which is provided at the vehicle body frame and is capable of translating in all directions on a floor surface and capable of turning;

a direction input device which receives a direction input corresponding to at least front, rear, left, and right directions inputted by a user;

a mode switching operator which receives a mode switching input corresponding to mode switching performed by the user; and a control device which controls the drive unit based on signals from the direction input device and the mode switching operator, wherein the direction input device includes a movement direction switch and a tilt angle sensor provided at the vehicle body frame to detect a tilt angle of the vehicle body frame, and the control device is configured to:

switch a travel mode of the drive unit between a translation mode and a turning mode based on the mode switching input, control the drive unit so that the drive unit translates with respect to the floor surface based on a signal from the direction input device when the translation mode is selected, control the drive unit so that the drive unit turns with respect to the floor surface based on a signal corresponding to a left or right direction from the direction input device when the turning mode is selected, control the at least one drive unit based on inverted pendulum control and drive the drive unit to translate or turn in a same direction as the tilt angle based on the tilt angle when the seat is at the high position; and control the at least one drive unit based on the signal from the direction input device when the seat is at the low position.

2. The vehicle according to claim 1, wherein the movement direction switch is a joystick.

3. The vehicle according to claim 1, wherein the mode switching operator is a push switch.

4. The vehicle according to claim 2, wherein the mode switching operator is a push switch.

5. The vehicle according to claim 1, wherein the movement direction switch and the mode switching operator are a common joystick, and the joystick outputs a signal corresponding to the direction input when receiving a tilt operation performed by the user, and outputs a signal corresponding to the mode switching input when receiving a push-in operation at a neutral position performed by the user.

6. The vehicle according to claim 1, further comprising an indicator for indicating the travel mode being executed.

7. The vehicle according to claim 2, further comprising an indicator for indicating the travel mode being executed.

8. The vehicle according to claim 3, further comprising an indicator for indicating the travel mode being executed.

9. The vehicle according to claim 5, further comprising an indicator for indicating the travel mode being executed.

10. The vehicle according to claim 1, wherein the drive unit is provided as a pair of left and right drive units, and each of the drive units comprises:

a pair of drive disks rotatably supported by the vehicle body frame and arranged coaxially and opposed to each other;

a plurality of drive rollers rotatably supported by the drive disk;

a pair of actuators respectively rotating the pair of drive disks independently; and a drive wheel which has an annular shape, is arranged coaxially with the drive disks between the pair of drive disks, is in contact with the plurality of drive rollers, and is rotatable around a central axis and around an annular axis.

11. The vehicle according to claim 2, wherein the drive unit is provided as a pair of left and right drive units, and each of the drive units comprises:

a pair of drive disks rotatably supported by the vehicle body frame and arranged coaxially and opposed to each other;

a plurality of drive rollers rotatably supported by the drive disk;

a pair of actuators respectively rotating the pair of drive disks independently; and a drive wheel which has an annular shape, is arranged coaxially with the drive disks between the pair of drive disks, is in contact with the plurality of drive rollers, and is rotatable around a central axis and around an annular axis.

12. The vehicle according to claim 3, wherein the drive unit is provided as a pair of left and right drive units, and each of the drive units comprises:

a pair of drive disks rotatably supported by the vehicle body frame and arranged coaxially and opposed to each other;

a plurality of drive rollers rotatably supported by the drive disk;

a pair of actuators respectively rotating the pair of drive disks independently; and a drive wheel which has an annular shape, is arranged coaxially with the drive disks between the pair of drive disks, is in contact with the plurality of drive rollers, and is rotatable around a central axis and around an annular axis.

13. The vehicle according to claim 5, wherein the drive unit is provided as a pair of left and right drive units, and each of the drive units comprises:

a pair of drive disks rotatably supported by the vehicle body frame and arranged coaxially and opposed to each other;

a plurality of drive rollers rotatably supported by the drive disk;

a pair of actuators respectively rotating the pair of drive disks independently; and a drive wheel which has an annular shape, is arranged coaxially with the drive disks between the pair of drive disks, is in contact with the plurality of drive rollers, and is rotatable around a central axis and around an annular axis.

14. The vehicle according to claim 6, wherein the drive unit is provided as a pair of left and right drive units, and each of the drive units comprises:

a pair of drive disks rotatably supported by the vehicle body frame and arranged coaxially and opposed to each other;

a plurality of drive rollers rotatably supported by the drive disk;

a pair of actuators respectively rotating the pair of drive disks independently; and a drive wheel which has an annular shape, is arranged coaxially with the drive disks between the pair of drive disks, is in contact with the plurality of drive rollers, and is rotatable around a central axis and around an annular axis.

* * * * *